US005896559A

United States Patent [19]

Okamura

[11] Patent Number: 5,896,559
[45] Date of Patent: Apr. 20, 1999

[54] RECEIVING OPERATION CONTROLLER OF COMMUNICATION APPARATUS

[75] Inventor: Hidetoshi Okamura, Tokyo, Japan

[73] Assignee: NEC Corporation, Tokyo, Japan

[21] Appl. No.: 08/804,696

[22] Filed: Feb. 25, 1997

[30] Foreign Application Priority Data

Feb. 29, 1996 [JP] Japan ................................ 8-042480

[51] Int. Cl.$^6$ ..................................................... H04Q 7/00
[52] U.S. Cl. .................. 455/31.1; 455/38.3; 340/825.44
[58] Field of Search ................................. 455/38.1, 38.3, 455/574, 571, 405, 406, 407, 409, 411, 565; 340/825.44, 825.33, 825.47, 311.1

[56] References Cited

U.S. PATENT DOCUMENTS

| | | | |
|---|---|---|---|
| 5,278,995 | 1/1994 | Hwang | 455/127 |
| 5,371,493 | 12/1994 | Sharpe et al. | 340/825.33 |
| 5,376,931 | 12/1994 | Marrs | 340/825.44 |
| 5,438,612 | 8/1995 | Norimatsu | 455/565 |
| 5,471,204 | 11/1995 | Kudoh et al. | 340/825.44 |
| 5,473,667 | 12/1995 | Neusein | 455/31.2 |
| 5,497,411 | 3/1996 | Pellerin | 455/411 |
| 5,652,571 | 7/1997 | Shima et al. | 455/38.1 |
| 5,686,900 | 11/1997 | Ono et al. | 455/38.1 |

FOREIGN PATENT DOCUMENTS 5-28149  4/1993  Japan .

*Primary Examiner*—Reinhard J. Eisenzopf
*Assistant Examiner*—Sam Bhattacharya
*Attorney, Agent, or Firm*—Young & Thompson

[57] ABSTRACT

The number of calls terminated in the receiver is counted by a terminated call counter, a decoder compares the count value with the present value and when the count value has reached the preset value, supply of power to the radio frequency section and waveform shaping section by the power supply control circuit is stopped to stopping the receiving operation. Moreover, reception stop symbol or message is displayed on a display section (LCD). Management at a base station is no longer required and a user of receiver is fully ensured to recognize stop of receiving operation to realize sufficient services.

5 Claims, 4 Drawing Sheets

RECEIVING OPERATION CONTROLLER OF COMMUNICATION APPARATUS

BACKGROUND OF THE INVENTION

1. Field of the Invention

The present invention relates to a communication apparatus and particularly to a receiving operation controller for a communication apparatus.

2. Description of Related Art

A communication apparatus, particularly a radio selective calling receiver is always in the reception waiting condition after the power switch is turned on. When a calling signal to own receiver is detected under the reception waiting condition from the receiving signal, the apparatus is informed and the received data is displayed. Therefore, battery capacity is consumed by each receiving operation or informing operation.

Meanwhile, regarding the technique for reducing consumption of battery capacity by calling in a hand-held portable telephone apparatus, Japanese Utility Model Application Laid-Open No. HEI5-28149 describes the technique that when the calling operation time in the calling apparatus for termination of a call has exceeded the predetermined time, the off-hook condition is established automatically and after a message is transmitted, operation of the calling apparatus is suspended. However, this technique can be applied only to the telephone apparatus comprising the transmitting function.

SUMMARY OF THE INVENTION

It is therefore an object of the present invention to provide an improved receiving operation controller for a communication apparatus that solves the problems explained above.

It is another object of the present invention to provide a pager for limiting the receiving operation depending on the number of times of receptions which will be made apparent later.

It is still further object of the present invention to provide a receiving operation controller for enabling improvement of the receiving function in a receiver.

A radio selective calling receiver of the present invention comprises a receiving section for receiving a selective calling number, an informing section for informing detection of self-selective calling signal when it is detected, a counter for counting the number of calls terminated to own apparatus and a control section for stopping the receiving operations in the receiving section when such count value has reached the predetermined value.

It is desirable that a waveform shaping circuit for shaping a waveform of the signal received by the receiving section, a decoder for detecting the calling of own apparatus on the basis of the receiving signal having shaped the waveform thereof, a power supply control circuit for controlling supply of power source to the receiving section and waveform shaping circuit and a terminated call counter for counting the number of times of calling to own apparatus and setting the preset value for terminated calls are provided so that the decoder compares the number of times of termination of calls to own apparatus with the preset value and stops the receiving operation by controlling the power supply control circuit based on the comparison result.

It is also possible to provide the structure that includes a waveform shaping circuit for shaping the signal received by the receiving section, a decoder for detecting the calling of own apparatus based on the receiving signal having shaped the waveform thereof and a terminated call counter for counting the number of times of calling to own apparatus and setting the preset value for terminated calls so that the decoder compares the number of times of termination to own apparatus with the preset value and stops the receiving operation by neglecting the receiving signal from the waveform shaping circuit based on the comparison result.

It is also possible to provide the structure that includes a waveform shaping circuit for shaping the signal received by the receiving section, a decoder for detecting the calling to own apparatus based on the receiving signal having shaped the waveform thereof, a memory for storing data included at least in the receiving signal, a CPU for controlling the decoder and memory, etc. and a terminated call counter for counting the number of times of calling to own apparatus and setting the preset value for terminated calls so that the decoder compares the number of times of calling to own apparatus with the preset value and stops the receiving operation by not storing the receiving signal data in the CPU based on the comparison result.

BRIEF DESCRIPTION OF THE DRAWINGS

These and other objects, features and advantages of this invention will become more fully apparent from the following detailed description taken with the accompanying drawings in which.

In the drawings, the same reference numerals denote the same structural elements.

DESCRIPTION OF THE PREFERRED EMBODIMENTS

Figure 1:
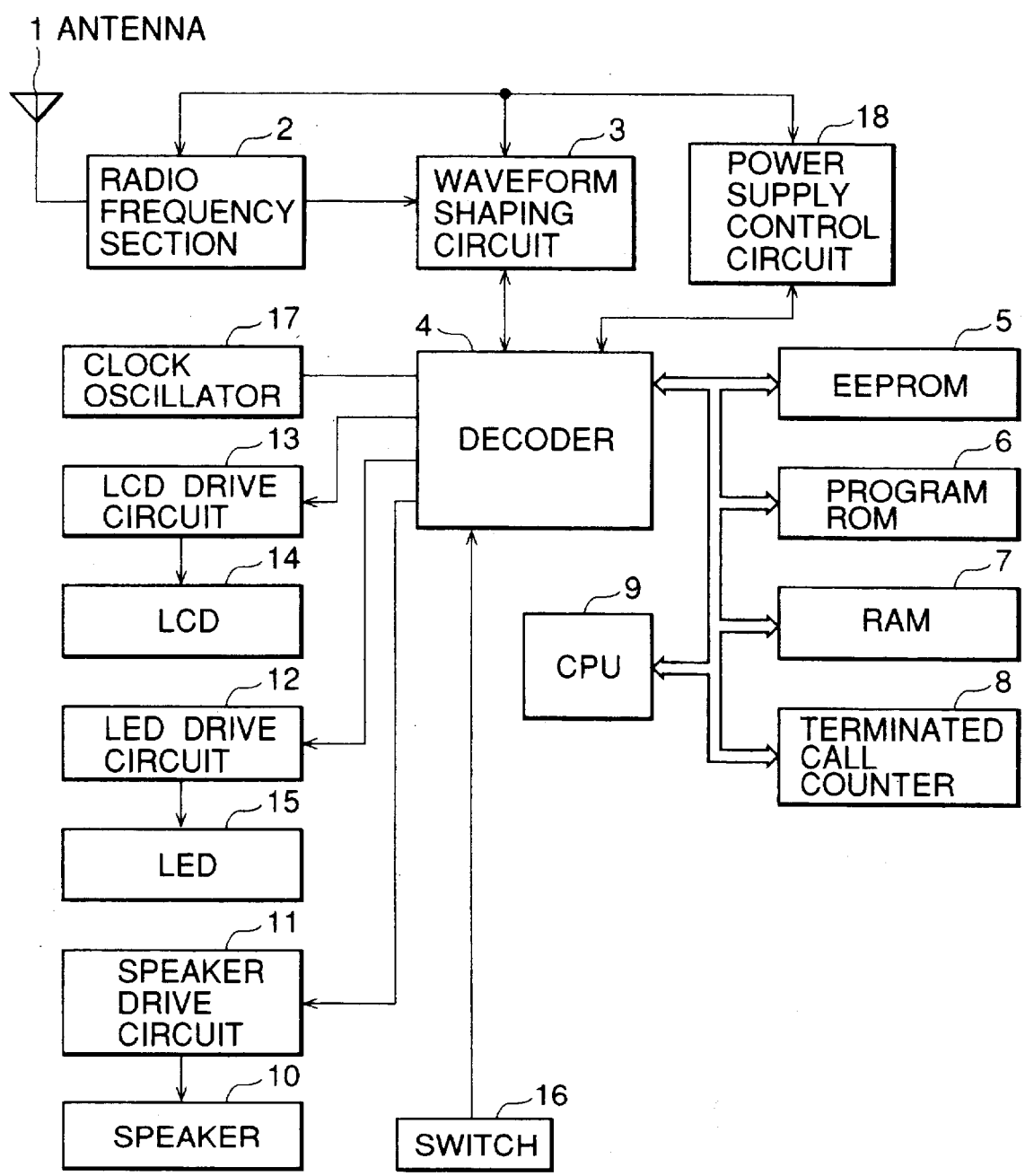
FIG. 1 is a structural block diagram of a preferred embodiment of the present invention.

FIG. 1 is a block diagram of the basic radio selective calling receiver of the present invention. A radio frequency signal received by an antenna 1 is demodulated by a radio frequency section 2. The demodulated signal is converted by a waveform shaping circuit 3 to the waveform which can be read by a decoder 4. The decoder 4 compares own calling number previously stored in an electrically erasable and programmable read only memory (EEPROM) 5 with a signal from the waveform shaping circuit 3 and executes, when these are matched, the reception informing operation to indicate detection of own calling number. The reception informing operation includes the detail operations that the decoder 4 supplies an audible signal to a speaker drive circuit 11, the speaker 10 is driven with a speaker drive circuit 11, the decoder 4 transmits a message signal to an LCD drive circuit 13, the LCD drive circuit 13 drives an LCD 14, the LCD 14 displays a message, the decoder 4 sends an LED lighting signal to an LED drive circuit 12 and the LED 15 is activated by an LED drive circuit 12 to light. However, it is enough when at least one operation among these operations is executed. A switch 16 is connected to the decoder 4 to stop the singing, display or stop the display of LCD 14 and turn on or off the power supply.

Moreover, the decoder 4 is connected, via a bus, with a program ROM 6, RAM 7, a terminated call counter 8 and a CPU 9. In the program ROM 6, a program for controlling and running the CPU 9 is written and RAM 7 is used as a temporary storing area for data, messages and various parameters generated during the processes in the CPU 9. Moreover, this terminated call counter 8 is structured, as will be explained later, to enable writing of the preset value of the count of the calls terminated, X, and the allowable value, Y, of the calls to be terminated. A clock oscillator 17 transfers the clock to the decoder 4 to generate various timing signals.

Figure 2:
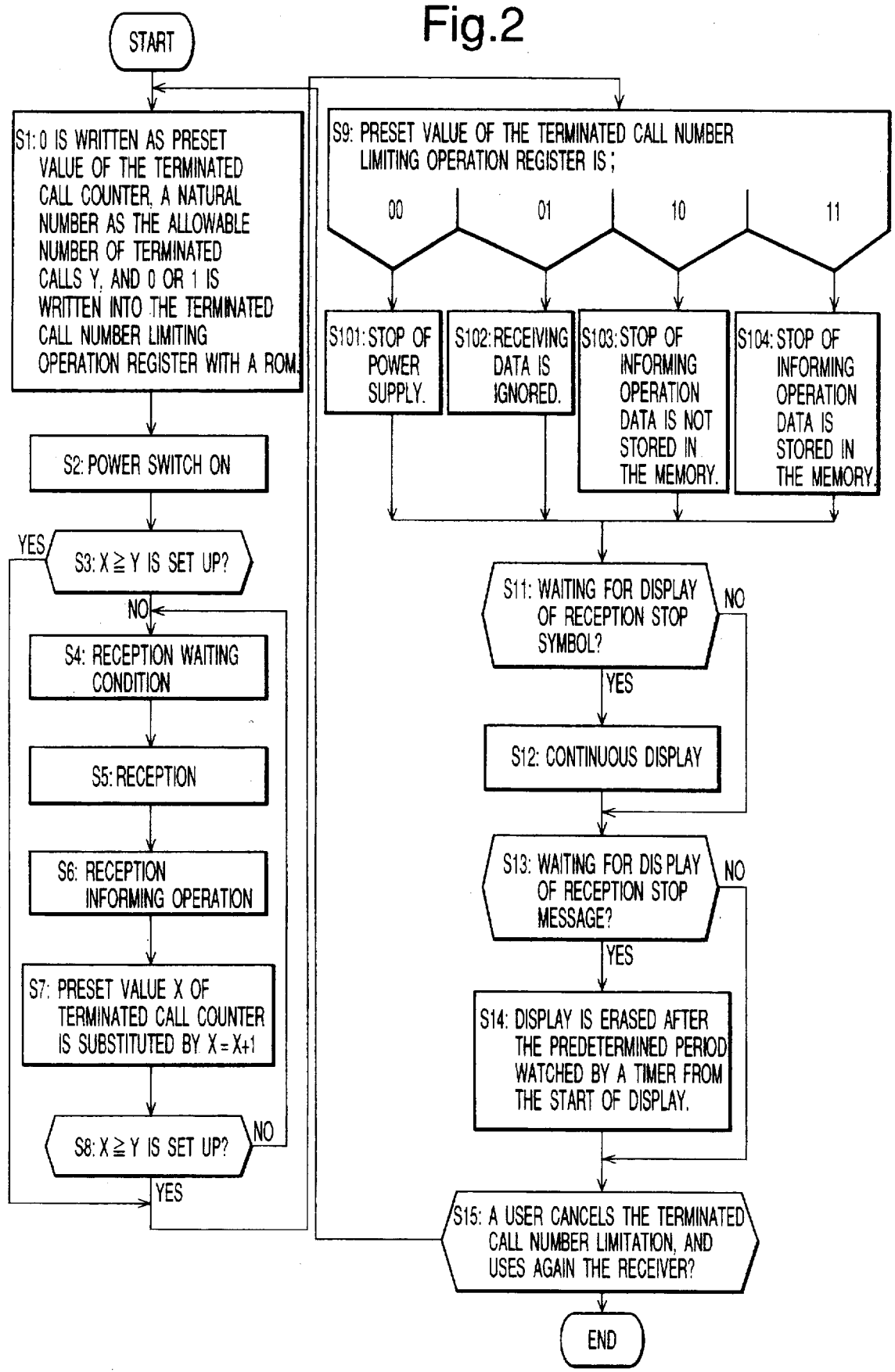
FIG. 2 is a flowchart for explaining preferred operation of the present invention shown in FIG. 1.

Next, operations for controlling the number of calls to be terminated of the receiver shown in FIG. 1 will be explained with reference to the flowchart of FIG. 2.

In the initial condition of the step S1, 0 is written as X, a natural number which is the allowable value as the number of calls terminated, or the number of call receptions, is written as Y and any one data of "00", "01", "10" or "11" is written into the terminated call number limiting operation register in the EEPROM 5 with a ROM writer to initialize the preset value X and allowable terminated call number Y of the terminated call counter 8 and the terminated call number limiting operation register. "Terminated call" means a call reception from a base station (not shown) to own receiver. Here, a value of the terminated call number limiting operation register indicates contents of the control function to stop the receiving operation, while "00" activates the control function to stop supply of power to the radio frequency section 2 and waveform shaping circuit 3, "01" the control function to neglect the receiving data of the decoder 4 received from the waveform shaping circuit 3, "10" the control function not to cause the CPU 9 to store the receiving data into the memory (RAM) 7 and not to execute the informing operation by the speaker 10 and LED 15, and "11" the control function to cause the CPU 9 to store the receiving data to the memory 7 but not to execute the informing operation.

Next, when the power switch is turned on (S2), the decoder 4 compares the preset value X of the terminated call counter with the allowable terminated call number Y (S3) and skips to the step S9 described later when $X \geq Y$. Moreover, when Y>X, the receiver enters the reception waiting condition (S4). Thereafter, the decoder 4 executes the reception informing operation (S6), upon detection of own calling number (S5). The practical reception informing operation means the operation to send the operation signal to the speaker drive circuit 11, LCD drive circuit 13 and LED drive circuit 12. Next, 1 is added to the value X of the terminated call counter 8 (S7), X and Y are compared again (S8), when Y>X, operation returns to the step S4, when $Y \leq X$, operation transfers to the next process (S9).

In the step S9, a value of the terminated call number limiting operation register of EEPROM 5 is read. When this value is "00", the decoder 4 sends the power supply stop signal to a power supply control circuit 18 to stop the operations of the radio frequency section 2 and waveform shaping circuit 3 (S101). When the value is "01", the decoder 4 ignores the receiving data from the waveform shaping circuit 3 (S102). When the value is "10", the CPU 9 does not store the receiving data from the decoder 4 into the RAM 7 and does not execute the reception informing operation using the speaker 10 and LED 15 (S102). When the value is "11", the CPU 9 stores the receiving data from the decoder 4 into the RAM 7 and also executes the reception informing operation (S104).

Figure 4:
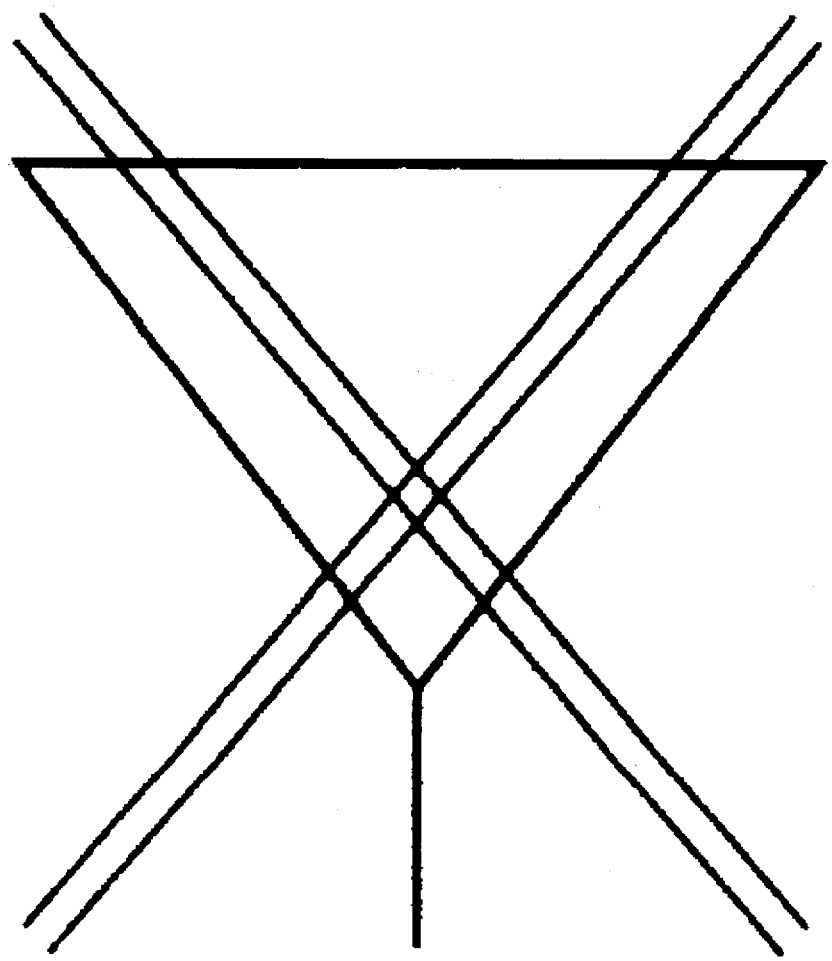
FIG. 4 is a preferred example of display of the reception suspending symbol shown in FIG. 2 or FIG. 3.

Here, the decoder 4 displays on the LCD 14, to a user, a symbol of the contents having reached the predetermined number of calls terminated, for example, the reception stop symbol as shown in FIG. 4. Otherwise, the decoder 4 sends, in order to display a message for stopping the receiving operation, the signal conforming to the display function of LCD 14 to the LCD drive circuit 13. Thereby the LCD drive circuit 13 causes the LCD 14 to display the reception stop symbol or reception stop message (S11). Thereafter, in the step S12 to step S14, the reception stop message is displayed. In the step S14, the reception stop message is displayed and simultaneously a timer is operated to erase the display after the predetermined period. Thereafter, depending on selection by a user, when the apparatus is to be used again, operation transfers to the step S1 for initialization. When the apparatus is not used moreover, operation step is terminated (S15).

The reception stop message display operation in the steps S12 to S14 will be explained below. The reception stop symbol is controlled so that it is always displayed in the symbol display area of LCD 14 and thereby the symbol is recognized by a user in the higher probability (S12). Meanwhile, the reception stop message is displayed during the predetermined period depending on the processes in the steps S13 and S14, considering the current to be consumed and when such predetermined period has passed, such message is erased. Namely, the CPU 9 counts up, when the reception stop message is displayed, the time until it reaches the predetermined period in order to erase the message display. When the display period of the reception stop message has reached the predetermined time, the decoder 4 instructs the LCD drive circuit 13 to erase this message and the LCD drive circuit 13 erases the reception stop message of LCD 14. When a user turns off the power switch and then turns it on again, the decoder 4 enters the reception stop mode and simultaneously displays the reception stop symbol or reception stop message. When the reception stop message is displayed, the decoder 4 erases the message after the predetermined period as is explained previously.

Figure 3:
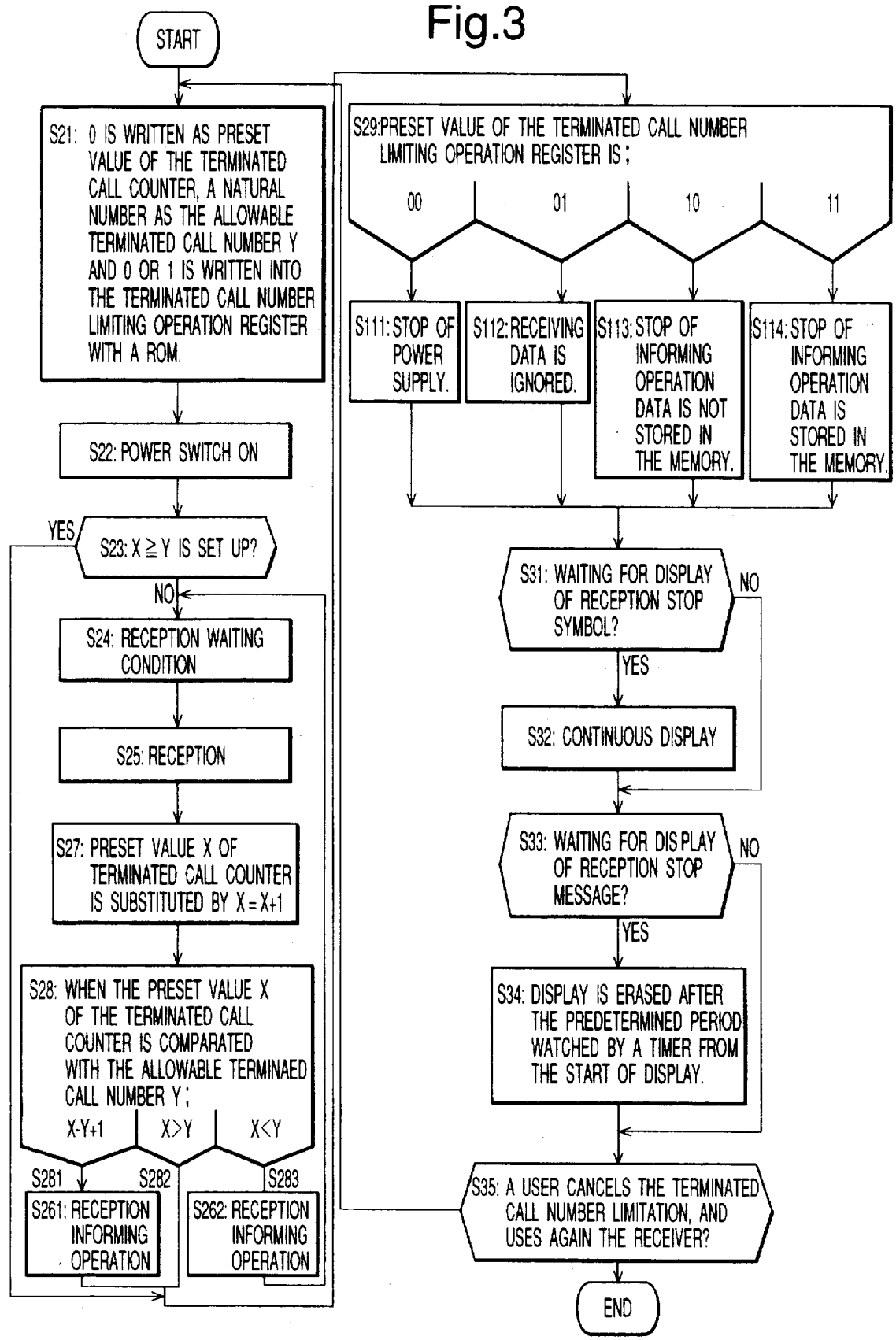
FIG. 3 is a flowchart for explaining the other preferred operation of the present invention shown in FIG. 1.

A preferred second operation of the present invention will be explained. The second operation is performed by the same structure as the receiver shown in FIG. 1. However, as shown in the flowchart of FIG. 3, operations of the terminated call counter is different from the operations shown in FIG. 2. First, in the initial condition of the step S21, 0 is written as X, a natural number as Y and any one of "00", "01", "10" or "11" to the terminated call number limiting operation register of EEPROM 5 with a ROM writer in order to initialize the preset value X, allowable terminated call number Y of the terminal call counter and the terminated call number limiting operation register. Function of these values "00", "01", "10" or "11" is same as that explained in regard to FIG. 2.

When the power switch is turned on, the decoder 4 compares the preset value X of the terminated call counter with the allowable terminal call number Y (S22, S23). When $X \geq Y$, operation transfers to the step S29. When Y>X, the receiver enters the reception waiting mode (S24). Upon detection of own calling number (S25), the decoder 4 adds 1 to the value X of the terminated call counter 8 (S27) and compares X and Y (S28). When Y>X (S283), operation transfers to S24 after the reception informing operation S262. When Y<X (S282), operation skips to the step S29. When X=Y+1 (S281), the operation transfers to the step S29 after execution of the reception informing operation S261.

In the step S29, a value of the terminal call number limiting operation of EEPROM 5 is read. When this value is "00", the decoder 4 sends the power supply stop signal to the power supply control circuit to stop the operations of the radio frequency section 2 and waveform shaping circuit 3 (S111). When the value is "01", the decoder 4 ignores the receiving data received from the waveform shaping circuit 3 (S112). When the value is "10", the CPU 9 neither stores the receiving data received by the decoder 4 into the RAM 7 nor executes the reception informing operation (S113). When the value is "11", the CPU 9 stores the receiving data received by the decoder 4 into the RAM 7 and executes the reception informing operation (S114).

Here, the decoder 4 sends the signal conforming to the display function of the LCD 14 to the LCD drive circuit 13 in order to display, for a user, the reception stop symbol or reception stop message having the contents having reached the predetermined number of calls terminated (S31) and causes the LCD 14 to display the reception stop symbol or reception stop message (S32, S33). In the step S34, the reception stop message is displayed and simultaneously a timer is activated to erase the display after the predetermined period. This reception stop message display process is same as the process in the step S14 of FIG. 2. Thereafter, depending on selection by a user, when the apparatus is used again, operation skips to the step S21 and thereby the apparatus is initialized again. When the apparatus is no longer used, operation is terminated (S35).

As explained above, the present invention is capable of limiting the number of times of receptions of call terminated to own receiver by itself by counting the number of calls terminated to own receiver and then stopping the receiving operation of the receiver when the counted value has reached the preset value. Thereby, a base station is no longer required to control the number of times of transmission for each receiver and control by the base station can be alleviated. Moreover, when a user of receiver is staying in the unreceivable area or has turned off the power switch of the apparatus during a certain period, termination of calls during such period is not counted as the number of times of termination. Therefore, termination of call in the predetermined number of times can be assured actually in the receiver. For this reason, when the receiver enters again the receivable area or the power switch is turned on again, termination of call is immediately actuated and the function of the receiver itself can be attained. Moreover, it is displayed on the receiver that reception has been stopped because the counter value has reached the predetermined number of times of termination. Otherwise, a message is also displayed when a user has turned off the power switch and turned it on again. Therefore, it can be informed accurately to a user that the reception has been stopped because the counter value has reached the predetermined number of times of termination.

While the invention has been described with reference to specific embodiments thereof, it will be appreciated by those skilled in the art that numerous variations, modifications, and embodiments are possible, and accordingly, all such variations, modifications, and embodiments are to be regarded as being with in the spirit and scope of the invention.

What is claimed is:

1. A radio selective calling receiver, comprising:
   a receiving section for receiving a signal embodying a selective calling number;
   a waveform shaping circuit for shaping the signal received by said receiving section;
   a power supply control circuit for controlling supply of power to said receiving section and said waveform shaping circuit;
   a decoder for determining whether the shaped signal embodies the receiver's selective calling number;
   an informing section for indicating when the receiver's selective calling number has been received;
   a call counter for counting a number of calls to the receiver's selective calling number that have been received at the receiver and for setting a preset value for a limit to the number of calls to the receiver's selective calling number that are to be received by the receiver; and
   wherein said decoder also compares the number of calls to the receiver's selective calling number that have been received at the receiver to the preset value and controls said power supply control circuit to stop operation of said receiving section when the number of calls received reaches the preset value.

2. A radio selective calling receiver according to claim 1, further comprising a display section for displaying a symbol or a message indicating that the number of received calls has reached the preset value, whereby said symbol or message is displayed when the receiving operation is stopped or a power switch is turned on.

3. A radio selective calling receiver, comprising:
   a receiving section for receiving a signal embodying a selective calling number;
   a waveform shaping circuit for shaping the signal received by said receiving section;
   a decoder for determining whether the shaped signal embodies the receiver's selective calling number;
   an informing section for indicating when the receiver's selective calling number has been received;
   a call counter for counting a number of calls to the receiver's selective calling number that have been received at the receiver and for setting a preset value for a limit to the number of calls to the receiver's selective calling number that are to be received by the receiver; and
   wherein said decoder also compares the number of calls to the receiver's selective calling number that have been received at the receiver to the preset value and causes the shaped signal from said waveform shaping circuit to be ignored when the number of calls received reaches the preset value.

4. A radio selective calling receiver, comprising:
   a receiving section for receiving a signal embodying a selective calling number;
   a waveform shaping circuit for shaping the signal received by said receiving section;
   a decoder for determining whether the shaped signal embodies the receiver's selective calling number;
   a memory for storing data included in the received signal;
   an informing section for indicating when the receiver's selective calling number has been received;
   a call counter for counting a number of calls to the receiver's selective calling number that have been received at the receiver and for setting a preset value for a limit to the number of calls to the receiver's selective calling number that are to be received by the receiver; and
   wherein said decoder also compares the number of calls to the receiver's selective calling number that have been received to the preset value and causes said memory not to store data included in the received signal when the number of calls received reaches the preset value.

5. A radio selective calling receiver, comprising:

a receiving section for receiving a signal embodying a selective calling number;

a waveform shaping circuit for shaping the signal received by said receiving section;

a decoder for determining whether the shaped signal embodies the receiver's selective calling number;

a memory for storing data included in the received signal;

a CPU for controlling said decoder and said memory;

an informing section for indicating when the receiver's selective calling number has been received;

a call counter for counting a number of calls to the receiver's selective calling number that have been received at the receiver and for setting a preset value for a limit to the number of calls to the receiver's selective calling number that are to be received by the receiver; and wherein said decoder also compares the number of calls to the receiver's selective calling number that have been received to the preset value and causes said CPU to store in said memory data included in the received signal when the number of calls received reaches the preset value without reporting that the receiver's selective calling number has been received.

* * * * *